Figure 1:
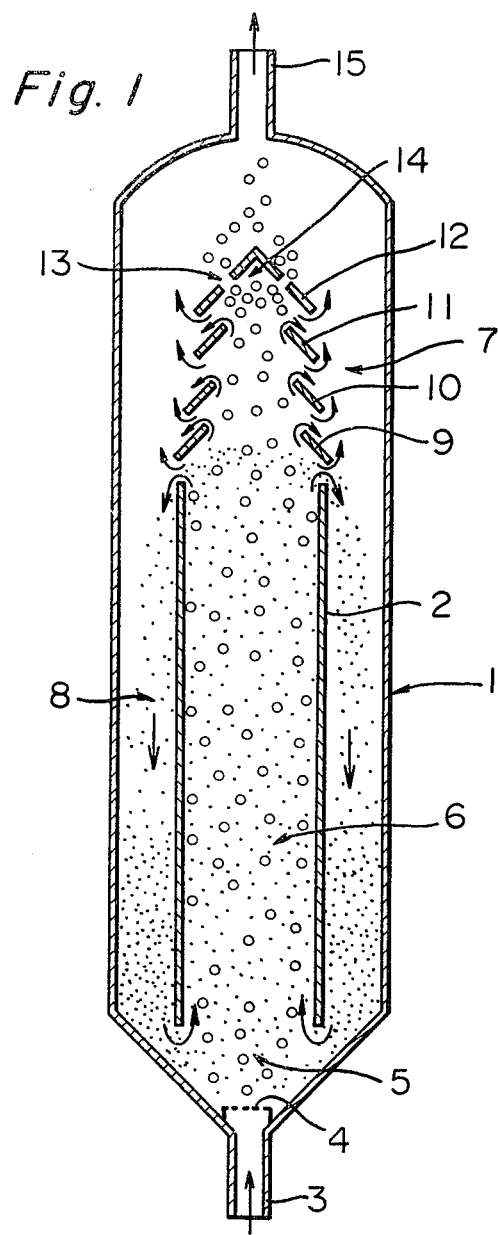

United States Patent [19]

Kubo et al.

[11] 3,957,626

[45] May 18, 1976

[54] MULTIPLE BUBBLE-COLLECTING ANNULAR PLATES IN A FLUIDIZED HYDRODESULFURIZATION OF HEAVY OIL

[75] Inventors: Junichi Kubo; Genichi Yamamoto, both of Kawasaki; Hideki Sakuma, Yokohama, all of Japan

[73] Assignee: Nippon Oil Company Ltd., Tokyo, Japan

[22] Filed: Nov. 11, 1974

[21] Appl. No.: 522,717

[30] Foreign Application Priority Data
Nov. 13, 1973 Japan............................... 48-126797

[52] U.S. Cl. ............................................... 208/213
[51] Int. Cl.² ......................................... C10G 23/02
[58] Field of Search................... 208/213, 157, 163

[56] References Cited
UNITED STATES PATENTS
3,031,769   5/1962   Wilson............................... 208/163
3,775,302   11/1973   Kubo et al. ......................... 208/213

Primary Examiner—Delbert E. Gantz
Assistant Examiner—G. J. Crasanakis
Attorney, Agent, or Firm—Sherman & Shalloway

[57] ABSTRACT

In a method for catalytic hydrodesulfurization of a heavy petroleum hydrocarbon oil in a reactor composed of a cylindrical pressure vessel and a cylindrical inner pipe, in which hydrogen gas, oil liquid and solid catalyst particles are concurrently present and the catalyst particles are fluidized and recycled in the reactor without flowing out of the reactor, an improvement for the prevention of the catalyst's efflux is achieved by the provision of a bubble-collecting plate and at least two catalyst particlescatching plates above the inner pipe in the reactor.

1 Claim, 1 Drawing Figure

U.S. Patent May 18, 1976 3,957,626

MULTIPLE BUBBLE-COLLECTING ANNULAR PLATES IN A FLUIDIZED HYDRODESULFURIZATION OF HEAVY OIL

This invention relates to an improved process for hydrogenating heavy oils catalytically, and is an improvement of the invention disclosed in U.S. Pat. No. 3,775,302.

Generally, the extremely short life of catalyst presents a serious problem in the catalytic hydrodesulfurization of heavy oils, because the hydrogenating catalyst is violently attacked by the asphaltenes or heavy metals present in the heavy oils. In order, therefore, to perform the catalytic hydrogenation of heavy oils more economically, it is necessary to develop a hydrogenating catalyst having a high hydrogenating activity and a long active lifetime. It is also important to improve the method and apparatus for catalytic hydrogenation. We previously disclosed a method for the catalytic hydrogenation of heavy oils using a fluidized-overflowing bed, which is superior to the conventional catalytic methods (Japanese Pat. Publication No. 29162/72).

One example of this catalytic hydrodesulfurization of heavy oils using a fluidized-overflowing bed comprises the steps of:

a. placing a particulate hydrodesulfurization catalyst into a desulfurizing reactor composed of a cylindrical pressure vessel accomodating therein a coaxially positioned, cylindrical inner pipe, b. introducing a heavy oil and a hydrogen-containing gas into the reactor from the lower part of the inner pipe to fluidize the catalyst particles substantially, c. causing upflow of a mixture of the heavy oil, hydrogen-containing gas and catalyst particles while desulfurizing the heavy oil, d. overflowing the mixture from the top of the inner pipe into a catalyst-separating zone which is positioned in the pressure vessel adjacent to the upper part of the inner pipe, wherein the hydrodesulfurization catalyst starts to separate from the mixture owing to the decrease in linear flow rate of the mixture caused by the greater cross-sectional area of the catalyst-separating zone than that of the inner pipe;

e. settling the hydrodesulfurization catalyst particles separated in the catalyst-separating zone through a catalyst-settling zone defined by the inner wall of the pressure vessel and the outer wall of the inner pipe;

f. again substantially fluidizing the settled desulfurization catalyst particles at the lower end of the inner pipe by the heavy oil and the hydrogen-containing gas, and upflowing the catalyst particles in the fluidized state, and g. separating in a gas-liquid separating zone the catalyst-freed mixture of the desulfurized heavy oil and the hydrogen-containing gas emerging from the catalyst-separating zone into the desulfurized heavy oil and the hydrogen-containing gas, and withdrawing them independently from each other.

The above-described catalytic hydrodesulfurization process ensures a uniform contact of the heavy oil, hydrogen-containing gas and desulfurization catalyst with one another, and the operating conditions for the reactor can be selected over a wide range. Furthermore, it is possible to withdraw the deteriorated catalyst, and feed a fresh catalyst and a regenerated catalyst without interrupting the operation. The period of continuous operation can thus be prolonged.

Generally, in hydrodesulfurization processes using fluidized catalyst particles, the use of a catalyst having a smaller particle size is advantageous since smaller sizes mean larger surface areas per unit weight of the catalyst, and lead to higher desulfurizing activity. However, catalyst particles of smaller particle sizes show a greater tendency to flow out of the reaction system from the upper part of the reactor while being entrained by the desulfurized heavy oil. With the above-described fluidized-overflowing bed, catalyst particles of small sizes can be used because the overflowing and separation of the catalyst particles can be performed as described above. In this case, the allowable range of the particle size of the catalyst is broad, and for example, small particles with a size of 0.1 to 1 mm in diameter can be used. This process, however, is still unsatisfactory because of its inability to completely prevent the accompanying outflow of a minor amount of fine catalyst particles. The outflow of such catalyst particles takes place not only as entrained by the liquid heavy oil, but also as adsorbed to bubbles of the hydrogen-containing gas rising through the reaction system by the adsorbing action of the gas-liquid surface. Even the minor amount of the catalyst carried out of the reaction system with the oil settles and accumulates in the subsequent paths downstream of the reactor, such as pipes, valves, or pumps, and causes interruption of the operation and eventually the breakdown of the reactor. The outflow of the catalyst particles, therefore, should be completely prevented.

In order to remedy such a defect, U.S. Pat. No. 3,775,302 discloses a process for catalytic hydrodesulfurization of heavy oils similar to the process described above but using only one funnel-shaped bubble-collecting plate and only one catalyst particle-catching plate which are provided in the catalyst-separating zone. We have found that this process is still unsatisfactory, and leaves room for further improvement.

It is an object of this invention to provide an improved process for catalytic hydrodesulfurization of heavy oils using a fluidized-overflowing bed which can prevent the entrainment and outflow of catalyst particles.

The "heavy oils" denote petroleum hydrocarbons containing asphaltenes, for example, atmospheric or vacuum distillation residues.

We repeated various experiments with a view to increasing the efficiency of separating catalyst particles using a bubble-collecting plate and a catalyst particle-catching plate. As a result, we have found that the bubble-collecting plate acts not only to cause the bubbles to gather at the center of the catalyst-separating zone, but also greatly to separate the cataylst particles. Specifically, we observed the movement of the liquid near the bubble-collecting plate in the catalyst separating zone using a model reactor made of plastics. When a dye was intermittently fed into the reactor from a liquid feed opening at its lower part, a greater portion of the liquid rising through the inner pipe entered an area defined by the bubble-collecting plate, and continued to rise. At the same time, there was naturally present an upflow stream of the liquid in the surrounding of the bubble-collecting plate. At this time, a part of the liquid which passed through the bubble-collecting plate formed a backflow along the surface of the bubble-collecting plate. In other words, we found that a part of the liquid formed a circulating flow via the bubble-collecting plate. Some fine catalyst particles rose through the catalyst-separating zone while being entrained by the upflow of the liquid, but as a result of collision with the bubble-collecting plate, these particles reached the exit at the upper part of the bubble-collecting plate after rising along the undersurface of the plate. A part of the liquid which left the exit of the plate circulated to the lower part of the bubble-collecting plate along the upper surface of the plates. The particles flowed down while being entrained by this circulating flow, and returned to the catalyst-settling zone. This experiment demonstrates that the bubble-collecting plate has an action not only of collecting bubbles, but also of separating the catalyst particles entrained by the upflow stream of the liquid.

For this reason, the use of two or more bubble-collecting plates has been found very effective. When the catalyst-separating efficiency is the same, the diameter of the bubble-collecting plate can be reduced when using two or more bubble-collecting plates as compared with the case of using only one bubble-collecting plate. This in turn can lead to the reduced disturbance of the upflow of the liquid from the periphery of the bubble-collecting plate, and the catalyst particles prevented from rising by the bubble-collecting plate can be settled more easily from the peripheral portion of the bubble-collecting plate. Accordingly, the use of two or more bubble-collecting plates gives rise to a synergistic effect of increasing the catalyst separating function of the bubble-collecting plate and reducing the diameter of the truncated lower portion of the bubble-collecting plate, thus leading to an increased rate of settling of the catalyst particles from the peripheral portion of the bubble-collecting plate. Consequently, the catalyst separating efficiency further increases.

A catalyst particle-catching plate which is conical in shape and contains at least one hole on the same circumference in the middle portion of the side wall of the cone is provided above these bubble-collecting plates. The bubbles collected at the central part of the catalyst-separating zone by the bubble-collecting plates are caught by the catching plate. Since this catching plate has at least one hole at its middle portion, the bubbles which have entered the area defined by the catching plate pass through the hole at its middle portion, and again rise through the catalyst-separating plate. A gas gathers in the conical area at the inside surface of the catalyst particle-catching plate and above the hole provided therein, and this area forms a gaseous zone.

The sum total of the opening areas of these one or more holes should be such that the amount of gas flowing in the gaseous zone can be well balanced with the amount of gas flowing out of this zone. If the sum total of the opening areas of the holes is too small, bubbles rise from the periphery of the catalyst particle-catching plate, and the ability of the plate to separate the catalyst particles is reduced. Furthermore, when the total sum of the opening areas of the holes is too large, and the liquid is entrained together with the gas, the ability of the catching plate to separate the catalyst particles is also reduced. The relation of these is determined by the amount of gas to be fed to the reactor, the temperature, and the pressure, and it is desirable to determine the optimum opening areas experimentally.

The ability of the catching plate to catch the catalyst particles is exhibited at the interface of the gaseous zone. Specifically, the fine catalyst particles adsorb to the interface of the bubbles or the bubbles adsorb to the surfaces of the catalyst particles. As a result, the catalyst particles are entrained by the bubbles, and rise through the catalyst-separating zone. Accordingly, the catalyst particles settle when these bubbles are destroyed. The gaseous zone formed at the upper portion of the catalyst particle-catching plate has an action of temporarily destroying the bubbles, and separating the catalyst particles from bubbles. This action is exhibited at the interface of the gaseous zone. Thus, it is desirable to increase the area of the interface of the gaseous zone as much as possible. However, if the interface of the gaseous zone is caused to approach the undersurface of the catalyst particle-catching plate too closely, the bubbles escape from the peripheral portion of the catalyst particle-catching plate even according to slight variations in the amount of the gas fed, and therefore, the catching efficiency of the catalyst particle-catching plate decreases. The catalyst particle-catching plate should therefore be designed so that the holes to be provided in its middle portion are not disposed at too low a position, and the total area of the holes is maintained at an optimum value.

According to this invention, small amounts of particles of the hydrogenation catalyst entrained by the bubbles are prevented from rising, and also from being entrained by the heavy oil to be treated, by providing first at least two hollow, frustoconical bubble-collecting plates on the central perpendicular axis in the catalyst-separating zone and further a hollow, conical catalyst particle-catching plate having at least one hole on the same periphery of the middle portion of the side wall of the cone and above these bubble-collecting plates.

In order to show the process of this invention specifically, one example of the present invention will be described with reference to FIG. 1 which schematically shows a cross-sectional view of one example of a reactor to be used in the process of this invention.

In FIG. 1, the black dots show catalyst particles, and the white circles show the bubbles of a hydrogen-containing gas. A pressure vessel 1 contains a cylindrical inner pipe 2 disposed therein, and the desulfurization catalyst is fed into the lower portion of the pressure vessel 1. A mixture of a heavy oil and a hydrogen-containing gas passes through a pipe 3, and enters the lower part of the pressure vessel 1 via a dispersing plate 4. At this part, the desulfurizing catalyst substantially begins to make motion. This area is called a fludization initiation area 5. In this area 5, the heavy oil, catalyst particles and hydrogen-containing gas are mixed, and the mixture rise through a reaction zone 6 provided within the inner pipe 2. In the reaction zone 6, the catalyst, the heavy oil and the hydrogen-containing gas rise while being in close contact with one another, and the hydrogenation of the heavy oil is performed substantially in the reaction zone formed within the inner pipe 2. In the reaction zone 6, the catalyst particles, the heavy oil and the hydrogen-containing gas are in such a state that the catalyst particles move substantially in the heavy oil and move upwards in the suspended state, while the hydrogen-containing gas rise in the form of bubbles through the suspension of the catalyst particles in the heavy oil. The heavy oil, the hydrogen-containing gas and the catalyst particles rising through the reaction zone 6 overflow at the upper end of the inner pipe 2, and enter the catalyst-separating zone where the rising speed of the heavy oil is retarded because the cross-sectional area of the pressure vessel is much larger than the cross-sectional area of the inner pipe 2, and hence the catalyst particles begin to settle. Thus, a greater portion of the desulfurizing catalyst particles overflow from the upper end of the inner pipe 2, and settle through a catalyst-settling zone 8 between the outer wall of the inner pipe 2 and the inner wall of the pressure vessel 1. The catalyst particles that have settled go down while forming, or not forming, a dense layer of the catalyst particles at the lower part of the catalyst settling zone, and enter the fluidization initiation zone 5 from the space formed between the lower end of the inner pipe 2 and the conical portion at the bottom of the pressure vessel 1. The catalyst particles that have entered the fluidization initiation zone 5 again rise through the reaction zone 6 while being entrained by the heavy oil and the hydrogen-containing gas.

On the other hand, the heavy oil and the hydrogen-containing gas rise while settling the catalyst particles in the catalyst separating zone 7. Most of the catalyst particles separate and settle in the catalyst-separating zone, but fine catalyst particles formed as a result of the cracking and abrasion of the catalyst particles fail to separate completely, and continue to rise. In addition, normal catalyst particles are also entrained by the heavy oil if the flow rate of the hydrogen-containing gas in increased. This is probably because the catalyst particles are entrained by the interface of the bubbles by an interaction between the interface of the bubbles and the catalyst particles. In order to increase the separating efficiency in the catalyst-separating zone 7, two or more bubble-collecting plates of hollow, frusto conical shape are provided. In FIG. 1, three such bubble-collecting plates are provided. As shown, three bubble-collecting plates 9, 10 and 11 are provided sequentially in the vertical direction in the catalyst-separating zone 7, and above them, a catalyst particle-catching plate 12 is provided. The bubble-collecting plate 9 is of a hollow frusto conical shape, and preferably, the diameter of the bottom of the collecting plate 9 is equal to, or larger than, that of the inner pipe 2. Most of the catalyst particles that have left the upper end of the inner pipe 2 immediately move to the bubble-collecting plate 9, and all of the bubbles and a part of the heavy oil pass the upper end of the bubble-collecting plate 9. Another part of the heavy oil leaves from the peripheral portion of the bubble-collecting plate 9, and rises through the catalyst-separating zone. A part of the catalyst particles which have collided with the bubble-collecting plate 9 rise along the under-surface of the bubble-collecting plate, and drop along the upper surface of the bubble-collecting plate 9 at its upper end exit. This is because a part of the heavy oil leaving from the bubble-collecting plate moves onto the upper surface of the bubble-collecting plate, or forms a localized circulatory flow via the bubble-collecting plate. Sometimes, a part of the catalyst particles which have collided with the bubble-collecting plate 9 immediately make a falling motion. The bubbles and the heavy oil which have passed through the bubble-collecting plate 9 further pass through the bubble-collecting plates 10 and 11, and allow any catalyst particles that may have risen to settle by the action of the bubble-collecting plate 9 in the manner described above. These three bubble-collecting plates may be of the same size, but preferably, the plates at upper positions are progressively smaller in size than the plate at the lowest position. This permits a larger space of the catalyst separating zone, and is preferred from the viewpoint of the effect of separating the catalyst. Above the bubble-collecting plate 11, the catalyst particle-catching plate 12 is provided. A plurality of holes 13 are provided on the same circumference at the middle portion of the wall of the catalyst particle-catching plate. The catalyst particle-catching plate 12 acts to separate the bubbles from the heavy oil. The area defined by the catalyst particle-catching plate 12 and positioned above the hole 13 of the plate forms a gaseous zone 14 owing to the bubbles. The hydrogen-containing gas which has been caught within the gaseous zone 14 again rises as bubbles from the hole 13. On the other hand, the heavy oil leaves the catching plate 12 from its peripheral portion at the bottom, and further rises through the catalyst-separating zone 7.

Minor amounts of the catalyst particles entrained by the bubbles at the interface of the gaseous zone 14 are mostly separated here. This results in the detachment of the catalyst particles from the interface of the bubbles.

The heavy oil from which the catalyst particles have thus been separated are withdrawn from a pipe 15, and are treated in a purification device downstream thereof.

The flow rate of the heavy oil rising in the peripheral portions of the bubble-collecting plates and the catalyst particle-catching plate should be maintained at a value lower than the terminal velocity of the catalyst particles so as to allow the separated catalysts to settle.

The catalyst separating efficiency in accordance with this invention will be given below.

EXAMPLE 1

The following experiment was performed using the apparatus specified below.

Reactor: height 1000 cm, diameter 65 cm
Inner pipe: height 700 cm, diameter 58 cm
The gap between the bottom of the reactor and the lower end of the inner pipe: 10 cm The first bubble-collecting plate was so positioned that its bottom was 10 cm above the top of the inner pipe, and the second bubble-collecting plate was positioned so that its bottom was 10 cm from the top of the first bubble-collecting plate. The catalyst particle-catching plate was further disposed so that its bottom was situated 10 cm from the top of the second bubble-collecting plate.

First bubble-collecting plate: a hollow, frustoconical shape with a bottom diameter of 58 cm, a top diameter of 32 cm, and a height of 13 cm Second bubble-collecting plate: a hollow frustoconical shape with a bottom diameter of 50 cm, a top diameter of 30 cm and a height of 10 cm Catalyst particle-catching plate: a hollow conical shape with a bottom diameter of 40 cm and a height of 20 cm; four holes with a diameter of 3 cm were provided on the same circumference 10 cm below the apex The operating conditions for the above reactor were as follows:
Starting oil: Khafji atmospheric distillation residue
Reaction temperature: 400°C.
Reaction pressure: 200 Kg/cm$^2$.G
Superficial liquid velocity in the inner pipe: 2.8 cm/sec.
Superficial gas velocity in the inner pipe: 1.3 cm/sec.
Desulfurization catalyst: Co—Mo—Al$_2$O$_3$ catalyst Average particle diameter: spherical particles with a diameter of 0.78 mm, 14–40 mesh (determined by the method set forth in JIS)

Apparent specific gravity: 1.59 g/cc

Hydrodesulfurization of the starting oil was performed for 30 days under the above conditions. It was found that the average amount of the desulfurizing catalyst that flowed out of the reactor was 0.002% by volume/hour/the total amount of the catalyst in the reactor. The average amount of the desulfurizing catalyst that flowed out of the reactor when the bubble-collecting plates and the catalyst particle-catching plate were not provided was determined by a preliminary test, and found to be 0.1% by volume/hour/the total amount of the catalyst in the reactor. This shows a marked improvement made in the present invention.

EXAMPLE 2

The following experiment was performed using a model test apparatus for designing a large-sized commerical desulfurizing apparatus.

Reactor: height 20 m, diameter 260 cm

Inner pipe: height 17 m, diameter 200 cm

The gap between the bottom of the reactor and the bottom end of the inner pipe: 65 cm The first bubble-collecting plate was positioned so that its bottom was 15 cm above the inner pipe. The second bubble-collecting plate was positioned so that its bottom was 12 cm above the top end of the first bubble collecting plate. The third, fourth and fifth bubble-collecting plates were positioned at the same intervals. The catalyst particle-catching plate was positioned so that its bottom was 15 cm above the top end of the fifth bubble-collecting plate.

First bubble-collecting plate: a hollow frustoconical shape with a bottom diameter of 200 cm, a top diameter of 176 cm and a height of 12 cm Second bubble-collecting plate: a hollow frustoconical shape with a bottom diameter of 180 cm, a top diameter of 156 cm and a height of 12 cm Third bubble-collecting plate: a hollow frustoconical shape with a bottom diameter of 160 cm, a top diameter of 136 cm and a height of 12 cm Fourth bubble-collecting plate: a hollow frustoconical shape with a bottom diameter of 140 cm, a top diameter of 116 cm and a height of 12 cm Fifth bubble-collecting plate: a hollow frustoconical shape with a bottom diameter of 120 cm, a top diameter of 72 cm and a height of 24 cm Catalyst particle-catching plate: a hollow conical shape with a bottom diameter of 80 cm and a height of 40 cm, 10 holes each 8 cm in diameter were provided on the same circumference 20 cm below the apex.

The operating conditions for the above apparatus were as follows:

Liquid: kerosene

Gas: nitrogen gas

Temperature: room temperature

Pressure: atmospheric pressure

Superficial liquid velocity in the inner pipe: 3.5 cm/sec.

Superficial gas velocity in the inner pipe: 1.2 cm/sec.

Desulfurization catalyst: $Co-Mo-Al_2O_3$ catalyst

Average particle diameter: spherical particles each with a diameter of 0.75 mm (14 to 40 mesh)

Apparent specific gravity: 1.62 g/cc

Hydrodesulfurization of kerosene was performed for 7 days under the above conditions. It was found that the average amount of the desulfurizing catalyst particles that flowed out of the reactor was 0.005% by volume/hour/the total amount of the catalyst in the reactor. When the same operation was performed for 7 hours except that no bubble-collecting plate nor catalyst-catching plate was used, the average amount of the catalyst particles that flowed out was 0.3% by volume/hour/the total amount of the reactor. This demonstrates that the apparatus of this invention has a very superior ability to prevent the outflow of the catalyst particles.

What we claim is:

1. In a process for the prevention of catalyst efflux in the hydrodesulfurization of a heavy petroleum hydrocarbon oil in a hydrodesulfurizing reactor composed of a cylindrical pressure vessel accommodating therein a coaxially positioned cylindrical inner pipe, by the steps comprising:

a. feeding hydrodesulfurization catalyst particles into the hydrodesulfurizing reactor, b. introducing heavy petroleum hydrocarbon oil and hydrogen-containing gas into the reactor at the lower part of said inner pipe to substantially fluidize the hydrodesulfurization catalyst particles in said inner pipe, c. upflowing the mixture of said oil, hydrogen-containing gas, and catalyst particles in said inner pipe, while performing the hydrodesulfurization reaction, d. overflowing a reaction mixture from the top of said inner pipe into an upper catalyst-separating zone positioned inside the pressure vessel adjacent to the upper part of said inner pipe, wherein the hydrodesulfurization catalyst separates from the gas-liquid mixture due to the decrease in linear flow rate of the reaction mixture caused by the greater cross-sectional area of the catalyst-separating zone than that of said inner pipe, e. settling the hydrodesulfurization catalyst separated in said catalyst-separating zone, into a lower catalyst-settling zone defined by the cylindrical wall of said pressure vessel and the wall of said inner pipe, f. upflowing again the settled hydrodesulfurization catalyst from said lower catalyst-settling zone into said lower part of said inner pipe in a substantially fluidized form, by the action of continuously supplied heavy petroleum hydrocarbon oil and hydrogen-containing gas from the bottom of said inner pipe, and g. withdrawing from the upper portion of said catalyst-separating zone the mixture of the hydrogen-containing gas and the desulfurized heavy oil from which the catalyst particles have been separated in said catalyst-separating zone; the improvement comprising:

h. providing at least two frusto-conical, downwardly-diverging, bubble-collecting annular plates on the perpendicular central axis of said catalyst-separating zone, said annular plates being arranged on said perpendicular central axis so that the larger diameter thereof is positioned downwardly, said larger diameter of the lowermost annular plate above said inner pipe being at least equal to the diameter of said inner pipe and the larger diameter of said annular plates positioned above said lowermost plate being progressively smaller in size than said larger diameter of said lowermost annular plate, and i. a catalyst particle-catching plate positioned above said bubble-collecting plates, said catalyst particle-catching plate being conical in shape and being arranged on said perpendicular central axis, the apex thereof being positioned upwardly and the conical surface thereof having openings communicating with the upper portion of said catalyst-separating zone, whereby catalyst particles entrained by gas bubbles in said catalyst-separating zone are prevented from rising above said conical apex, thus preventing catalyst particles from accompanying said desulfurized oil being withdrawn from said vessel.

\* \* \* \* \*